United States Patent
Sokoloff et al.

(10) Patent No.: US 7,643,212 B1
(45) Date of Patent: Jan. 5, 2010

(54) ROTATIONALLY TUNABLE OPTICAL DELAY LINE

(76) Inventors: Jason P. Sokoloff, 21 Oak Ridge Dr., Belle Mead, NJ (US) 08502; Lawrence Sokoloff, 19 Village La., Mt. Laurel, NJ (US) 08054

( * ) Notice: Subject to any disclaimer, the term of this patent is extended or adjusted under 35 U.S.C. 154(b) by 0 days.

(21) Appl. No.: 12/287,416

(22) Filed: Oct. 9, 2008

Related U.S. Application Data

(60) Provisional application No. 60/998,374, filed on Oct. 10, 2007.

(51) Int. Cl.
*G01B 9/02* (2006.01)
*G02B 5/30* (2006.01)

(52) U.S. Cl. .............................. 359/501; 356/450

(58) Field of Classification Search ............... 372/20, 372/21, 27
See application file for complete search history.

(56) References Cited

U.S. PATENT DOCUMENTS

| | | | | |
|---|---|---|---|---|
| 4,678,287 A | * | 7/1987 | Buhrer | 359/498 |
| 5,175,736 A | * | 12/1992 | Woodward et al. | 372/20 |
| 5,206,867 A | * | 4/1993 | Esterowitz et al. | 372/20 |
| 5,260,953 A | * | 11/1993 | Rowe | 372/20 |
| 5,596,986 A | * | 1/1997 | Goldfarb | 600/323 |
| 5,852,620 A | * | 12/1998 | Wan | 372/22 |

* cited by examiner

*Primary Examiner*—Hwa S Lee (Andrew)

(57) ABSTRACT

A rotationally tunable time delay line device for providing a continually adjustable time delay between two orthogonally polarized laser pulses is described. The device is comprised of one or more rotational delay crystals, each made of a flat uniaxially birefringent crystal with a special orientation of its internal optical axis. The time delay generated between the two orthogonally polarized laser pulses that travel through the rotationally tunable delay line can be continually adjusted by rotating the constituent rotational delay crystals around their surface normals. An application is demonstrated in detail where the rotationally tunable time delay line device is used to form an optical autocorrelator for measuring femtosecond or picosecond duration laser pulses.

13 Claims, 6 Drawing Sheets

Prior Art

ROTATIONALLY TUNABLE OPTICAL DELAY LINE

CROSS REFERENCE TO RELATED APPLICATIONS

Figure 1:
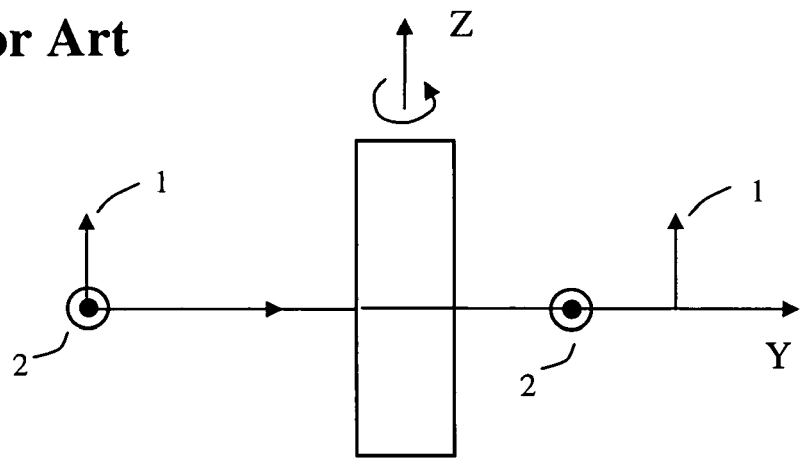

This application claims priority from Provisional Patent Application No. 60/998,374 filed Oct. 10, 2007 by the present inventors, which is incorporated by reference.

FEDERALLY SPONSORED RESEARCH

None

SEQUENCE LISTING

None

FIELD OF INVENTION

The present invention relates to tunable optical delay lines, specifically tunable optical delay lines that have applications in optical communications systems as well as in optical test and measurement devices, including a device known as an optical autocorrelator which is commonly used for measuring the duration of ultrashort optical pulses.

DISCUSSION OF PRIOR ART

Tunable optical delay lines are used to control the transit time of a light beam between two points. Conventionally a delay line device has been utilized in many applications including compensating time delay in pulsed laser devices, and scanning the delay of one pulse relative to another in ultrafast spectroscopy or optical coherence tomography. A typical delay line device utilizes several mirrors, and a movable stage which holds mirrors, to redirect a light path. It generally functions as follows: a first stationary mirror directs a light beam into the movable stage where it is redirected to a second stationary mirror. The total distance the light beam travels between the stationary mirrors is controlled by adjusting the movable stage. There are many ways to adjust the path length such as by a linear displacement of a stage[Kurobori T, Cho Y, Matsuo Y Opt. Commun. 40 156 (1981), Watanabe A, Tanaka S, Kobayashi H Rev. Sci. Instr. 56 2259 (1985), Watanabe A, Saito H, Ishida Y, Yajima T Opt. Commun. 69 405 (1989)], rotation of a corner reflector [Harde H, Burggraf H Opt. Commun. 38 211 (1981), Xinan G, Lambsdorff M, Kuhl J, Biachang W Rev. Sci. Instr. 59 2088 (1988)], rotation (swinging) of a two-mirror periscope [Yasa Z A, Amer N M Opt. Commun. 36 406 (1981), Baraulya V I, Kobtsev S M, Korablev A V, Kukarin S V, Yurkin, A M Techn. Progr. of IX Intern. Conf. Laser Optics' (St.Petersburg, Russia, 1998), p. 79, Riffe D M, Sabbah A J Rev. Sci. Instr. 69 3099 (1998)], or rotation of a reflector of special multi-surfaced shape [C. L. Wang U.S. Pat. No. 5,907,423]. Most, if not all of these approaches require multiple mechanical components which take up significant space and require careful optical alignment that is difficult to maintain over time.

One common and critical application of a tunable optical delay line is in an optical autocorrelator. An optical autocorrelator is an instrument that is used to measure the temporal width of femtosecond or picosecond light pulses. In most autocorrelators a light beam of these temporally short pulses is split into two beams. One of the beams travels a fixed optical path to a detector and the other traverses a tunable optical delay line and is then recombined with the first light beam before entering the detector. By repeatedly scanning the optical delay line and recording the detector signal, the temporal width of the optical pulses can be measured.

Figure 2:
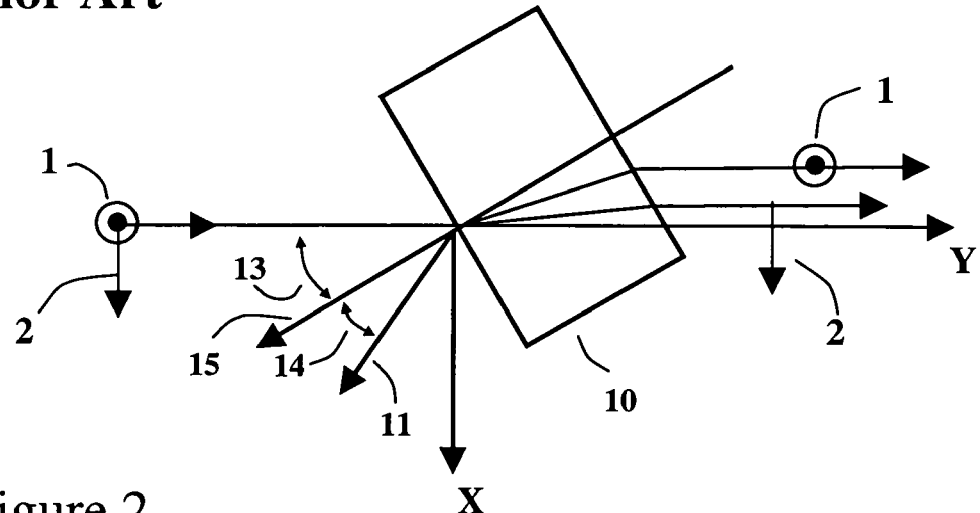

The prior art most pertinent to the current invention are a patent published in 1998 by Wan [U.S. Pat. No. 5,852,620] and a publication covering the same material by Kobtsev [Kobtsev S M, Kukarin S V, Sorokin V B Digest CLEO/Europe-2000 (Nice, France, 2000, CTuK 103), p. 138] in 2000. Wan describes an optical autocorrelator that uses a specially cut birefringent crystal referred to in his patent as a "Tunable Time Plate". The specially cut crystal explicitly removes the optical components conventionally used to split and recombine light beams in an autocorrelator by exploiting well-known optical properties of a birefringent crystal. A birefringent crystal, due to the fact that it has a unique internal axis often referred to as the optic axis or c-axis, can split a light pulse into two orthogonally polarized beams called an ordinary beam and an extraordinary beam. Referring to FIG. 1 and FIG. 2, the Tunable Time Plate in the Wan patent (hereafter referred to as the Wan Time Plate) is a birefringent plate 10 that swings about the Z axis, so that the incident angle 13 of the light beam to both the plate's surface normal and the c-axis 11 is changed. Changing the angle of incidence 13 continuously varies the propagation time of the extraordinary beam 2 relative to the ordinary beam 1 through the Wan Time Plate 10 making it the act as a tunable time delay line. Note that the c-axis 11 always stays perpendicular to the rotation axis, that is the Z axis in FIG. 1. This is not the case in the present invention.

Figure 3:
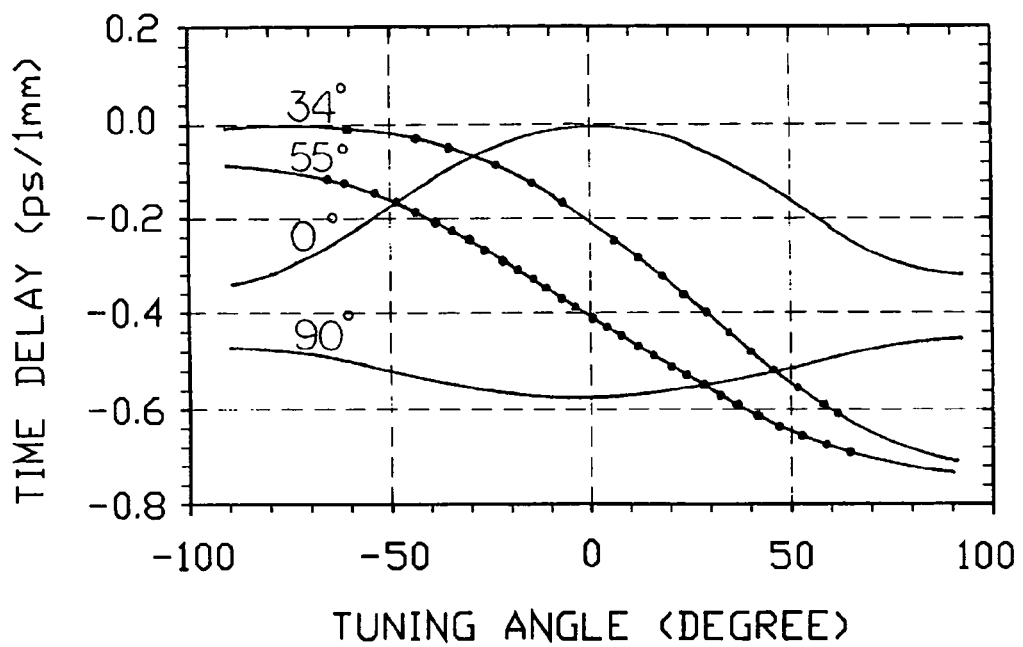

The time delay between the ordinary beam 1 and extraordinary beam 2 for the Wan Time Plate is plotted in FIG. 3 for different cut angles 14 of the crystal c-axis relative to the surface normal 15. A drawback of this approach is that large changes in the angle of incidence 13, that is large swing angles, are necessary to achieve time delays commonly used in autocorrelators. For example a swing of the angle of incidence 13 of more than 50 degrees is required for a −0.2 ps delay per mm of crystal for the 0 degree case in FIG. 3. This is a drawback because changing the angle of incidence 13 also changes the intensity of transmitted light in both the ordinary ray 1 and extraordinary ray 2, and an autocorrelator requires two beams of equal and constant intensity to work properly. Another drawback of this approach, as can be seen in FIG. 3, is that the delay of one beam relative to the other never crosses through zero. In other words the first beam is always delayed relative to the second beam by some delay time, so a second plate that acts as an constant offset delay, is needed by Wan to generate both positive and negative net delays. A further drawback of this approach is that the mechanical drive that repeatedly scans the Wan Time Plate must be of a reciprocating nature or at the very least an indirect drive mechanism which requires some complex coupling or control.

Therefore, it is desirable to have a new device for generating time delays in autocorrelators or pulsed laser devices, which can overcome the drawbacks of both conventional delay lines and existing tunable time plate delay line devices, as well as provide new features for time delay generation and compensation.

SUMMARY

Objects and Advantages

The present invention is a tunable rotational delay line, or RDL, for generation of time delays in pulsed laser devices, particularly femtosecond and picosecond pulsed laser devices.

It is an object of the present invention to provide a new optical delay line device for generating the time delay between two laser pulses. The new rotationally tunable delay device utilizes one or more specially manufactured crystals with a predetermined cutting angle. Each crystal is called a "rotational delay crystal" (abbreviated hereafter as RDC) and is generally round or rectangular shaped with two parallel surfaces. The RDC is positioned in the passage of one or more light beams that may be comprised of picosecond or femtosecond duration laser pulses. The optical property of the RDC causes a tim dispersion or time delay between two orthogonally polarized laser pulses. The adjustment of the time delay is achieved by rotating the RDC about its surface normal. The value of the time delay is determined by the rotation angle about the RDC surface normal, the cutting angle, the thickness, and the indices of refraction of the RDC. This time dispersion can be used to generate a time delay line in many laser apparatuses, such as a polarization mode dispersion (PMD) compensator in telecommunications, a "tripler" for second and third harmonic generation of laser light, and an autocorrelator for measuring femtosecond or picosecond duration laser pulses.

In one of the basic embodiments of the present invention, one RDC is used to split a light beam into orthogonally polarized components and delay one component relative to the other. The induced delay is either always negative or always positive. In an alternative embodiment two RDCs are juxtaposed and attached together to make a composite RDC, which when rotated can produce a positive or negative time delay, depending on the rotation angle of the composite RDC.

Either embodiment allows the rotationally tunable delay plate device to be utilized in femtosecond third harmonic generators (THG), an autocorrelator, or a PMD compensator.

Further novel features and other objects of the present invention will become apparent from the following detailed description, discussion and the appended claims, taken in conjunction with the drawings.

DRAWINGS

FIGS. 1-9

FIG. 1. Prior art—Wan Time Plate, side view

FIG. 2. Prior art—Wan Time Plate, top view

FIG. 3. Prior art—Wan Time Plate, time delay versus rotation angle.

Figure 4:
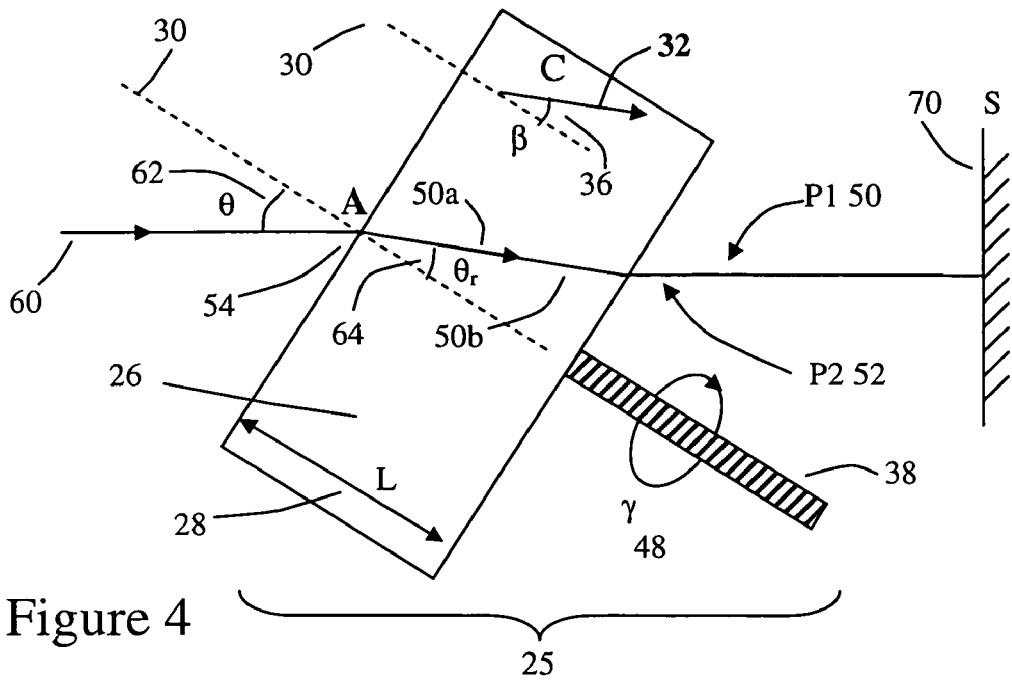

FIG. 4. Rotational Delay Line showing a first orientation of a rotational delay crystal.

Figure 5:
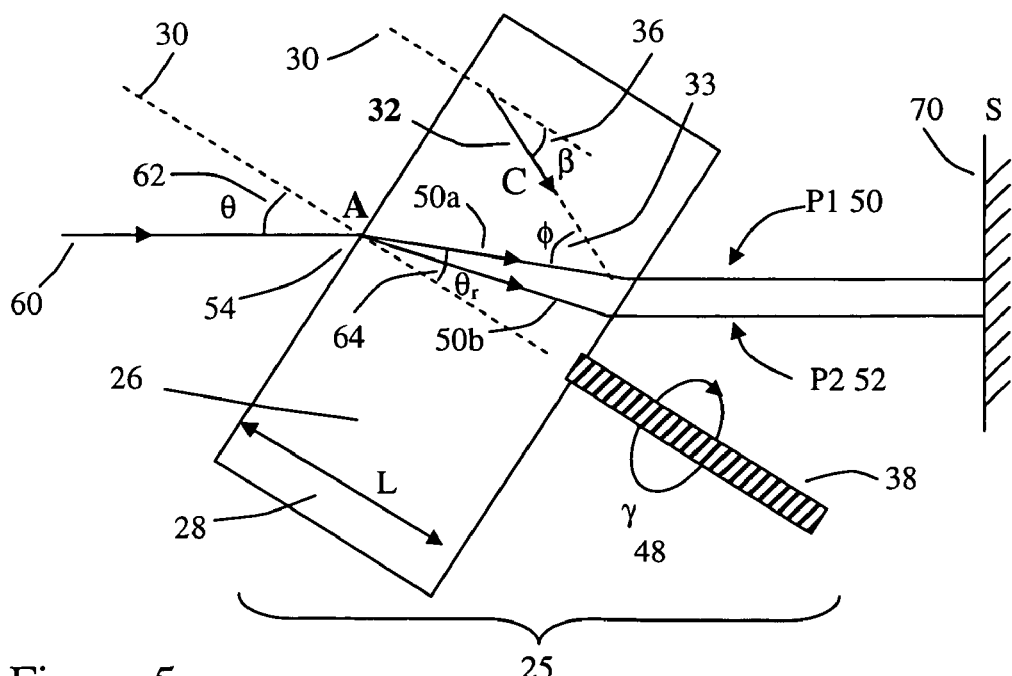

FIG. 5. Rotational Delay Line showing a second orientation of the rotational delay crystal.

Figure 6:
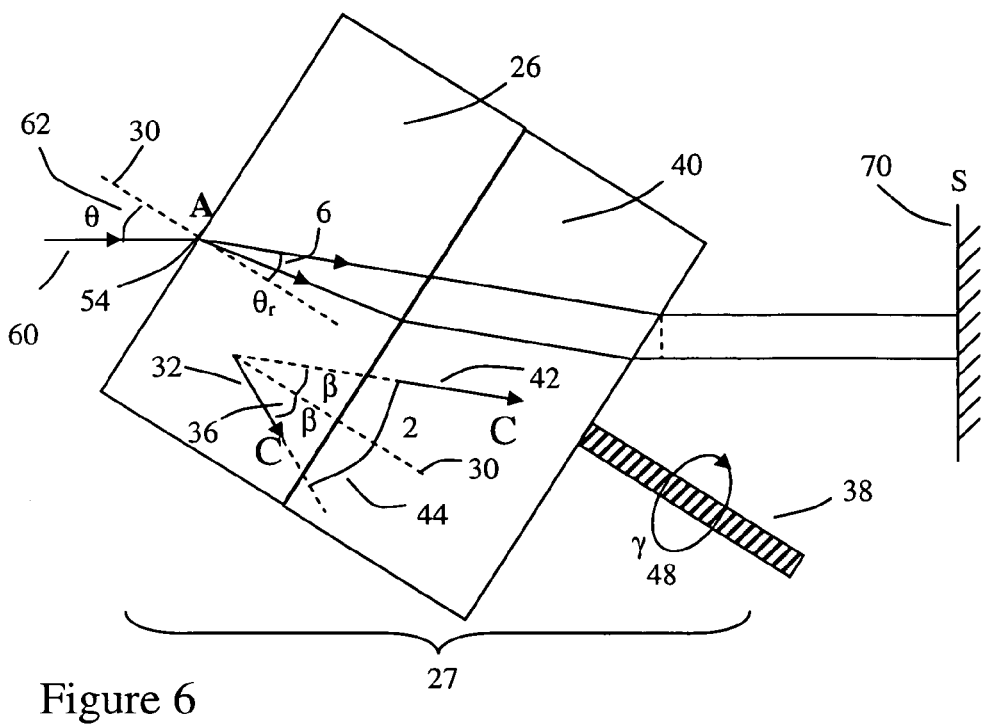

FIG. 6. Rotational Delay Line with a composite rotational delay crystal.

Figure 7:
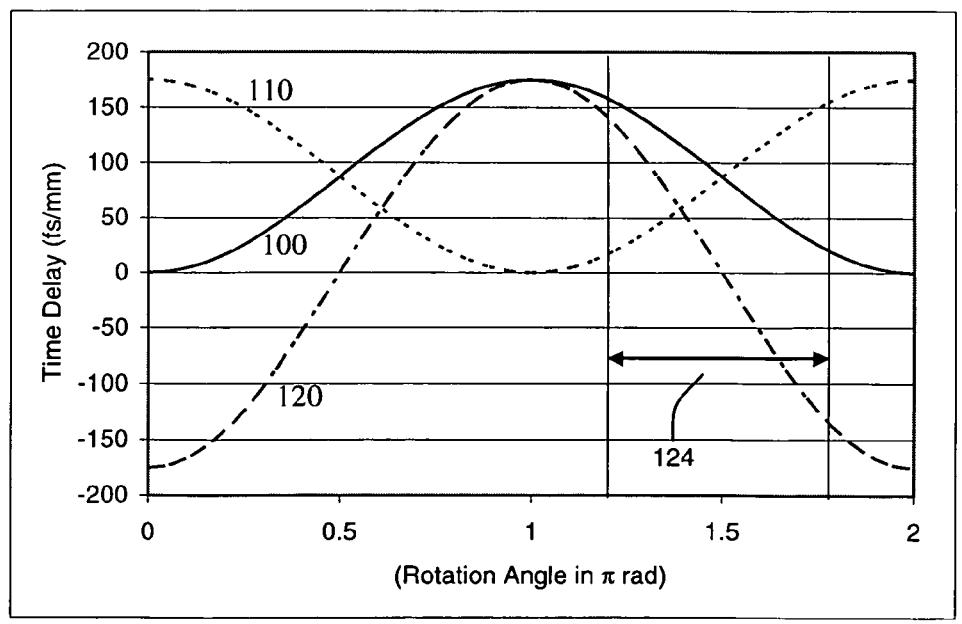

FIG. 7. Rotational Delay Line; Time Delay versus rotation angle.

Figure 8A:
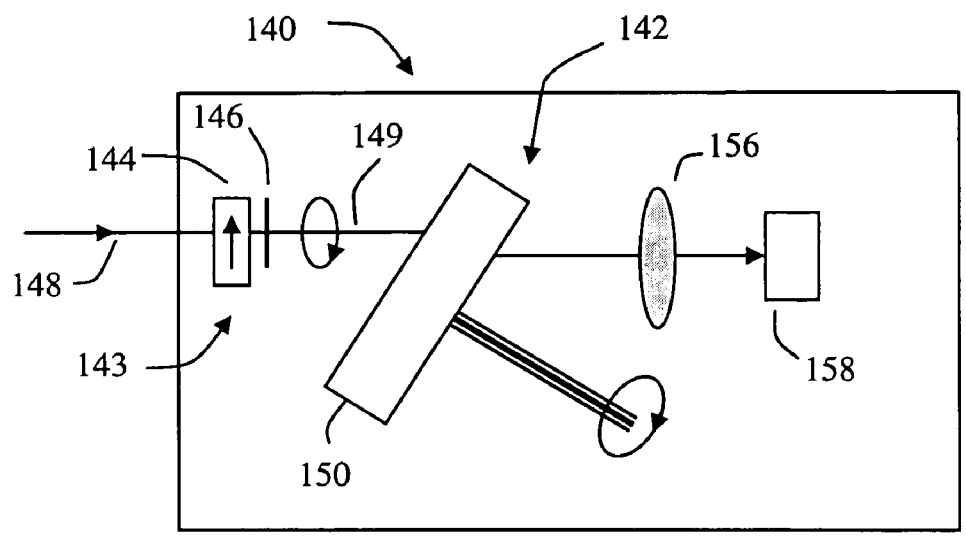

FIG. 8a. A first embodiment of an optical autocorrelator made from a Rotational Delay Line.

Figure 8B:
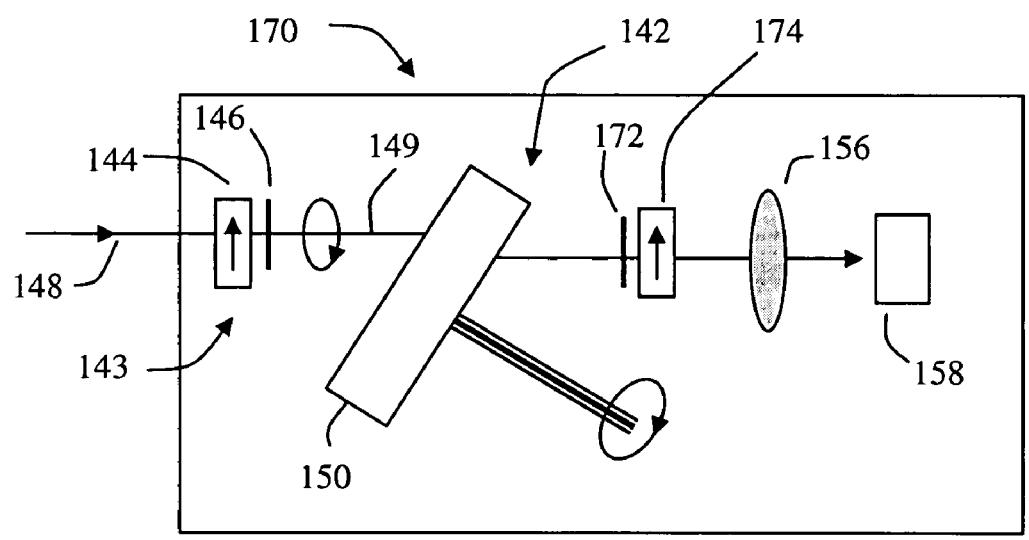

FIG. 8b. A second embodiment of an optical autocorrelator made from a Rotational Delay Line.

Figure 8C:
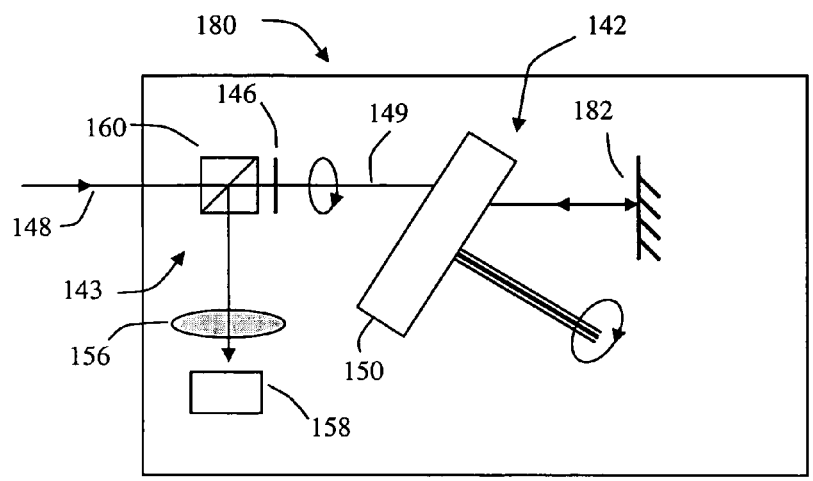

FIG. 8c. A third embodiment of an optical autocorrelator made from a Rotational Delay Line.

Figure 9:
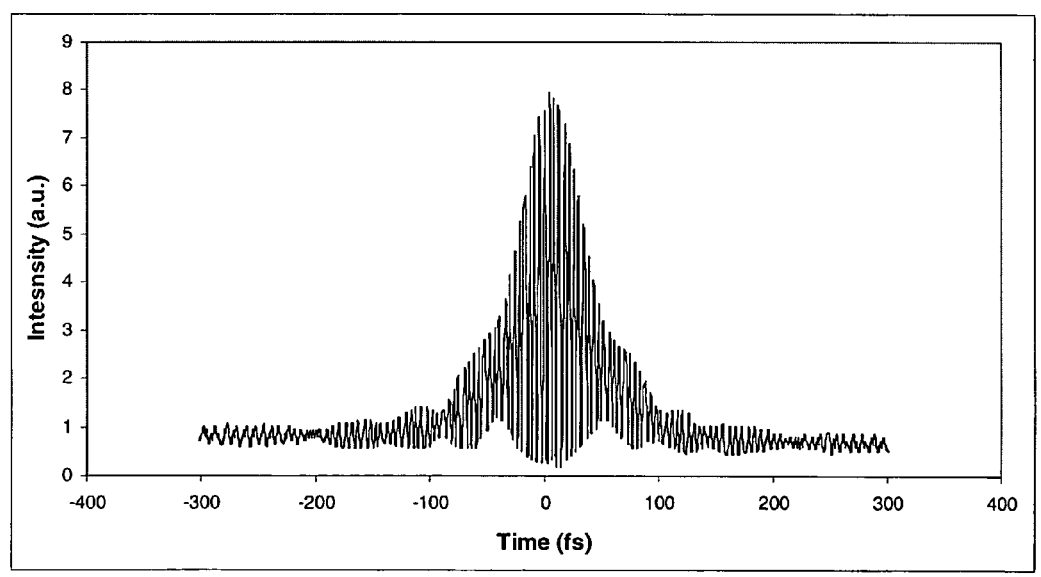

FIG. 9. Autocorrelation trace from an autocorrelator made from an autocorrelator configured as in the autocorrelator of FIG. 8c.

DRAWINGS

References and Numerals

1 Prior Art: ordinary ray
2 Prior Art: extraordinary ray
10 Prior Art: Tunable Time Plate
11 Prior Art: crystal c-axis
13 Prior Art: Angle of Incidence
14 Prior Art: Cut angle of crystal c-axis
15 Prior Art: Surface normal
25 First embodiment of Rotational Delay Line or RDL
26 Uniaxial birefringent crystal or RDC
28 Length L of RDC
30 Surface normal of RDC
32 Internal optical axis or c-axis of first RDC 26
33 Angle $\phi$ between the RDC c-axis 32 and o-ray inside RDC 26
36 Angle of c-axis to the surface normal of RDC
38 Shaft or means of rotation of RDC
40 Second uniaxial birefringent crystal or second RDC
42 C-axis of second RDC
44 Angle of the c-axis of first RDC to the c-axis of second RDC
48 Rotation angle of Rotational Delay Line
50 Path P1
50a o-ray inside RDC 26
50b e-ray inside RDC 26
52 Path P2 of e-ray starting from point A 54 and ending at Surface S 70
54 Point A
60 incident light ray
62 incident ray angle $\theta$
64 o-ray refraction angle, $\theta_r$
70 Surface S
100 Time Delay curve of RDL with RDC 26
110 Time Delay curve of RDL with RDC 40
120 Time Delay curve of RDL 27 with RDC 26 and RDC 40
124 Nearly linear region of RDL 27 Time Delay curve 120
140 Optical Autocorrelator
142 RDL in Autocorrelator 140
143 Circular Polarizer
144 Linear polarizer
146 Quarter Wave Plate
148 Incident beam into autocorrelator 140
149 Circularly polarized beam
150 One or two unit RDC of RDL 142
156 Focusing lens
158 Photodetector unit
160 Polarization beam splitter
170 Second embodiment of an autocorrelator
172 Quarter Wave Plate
174 Linear polarizer
180 Third embodiment of an autocorrelator
182 Reflector or retroreflector 200 Actual trace from an autocorrelator according to embodiment in FIG. 8c.

DETAILED DESCRIPTION

FIGS. 4-7

A. Theory of Propagation of Light in a Uniaxial Crystal

This section briefly summarizes some of the important optical properties of uniaxial crystals that are relevant to this invention. A uniaxial crystal has three principal crystallographic axes usually labeled as the a-, b-, and c-axis, with the c-axis being a unique axis. When a light ray enters a uniaxial crystal there are three cases of interest.

Case 1

The light ray enters traveling parallel to the c-axis. In this case the light ray is polarized perpendicular to the c-axis and is called an ordinary ray or "o-ray". Its propagation velocity depends only on the value of the crystal's ordinary refractive index, $n_o$.

Case 2

The light ray enters traveling perpendicular to the c-axis. In this case any component of the light ray that is polarized perpendicular to the c-axis is an o-ray, but any component of the light that is polarized parallel to the c-axis is called an extraordinary ray or "e-ray". The propagation velocity of the e-ray is different from that of the o-ray and depends only on the value of the crystal's extra-ordinary refractive index, $n_e$.

Case 3

The light ray enters the uniaxial crystal along a direction not parallel to the crystal c-axis. It separates into two orthogonally polarized rays: an ordinary ray or "o-ray", and an extraordinary ray or "e-ray". These two rays travel at slightly different velocities and in slightly different directions. The o-ray is polarized perpendicular to the c-axis and propagates at a speed dependent on the crystal's ordinary refractive index, $n_o$. The e-ray is polarized in the plane defined by the o-ray and c-axis, and propagates at a speed that depends on $n_o$, $n_e$, and $\phi$—the angle between the o-ray and the c-axis. For this general case the e-ray refractive index has an angular dependence $$n_e(\phi) = [\sin^2(\phi)/n_e^2 + \cos^2(\phi)/n_o^2]^{-1/2} \quad (1)$$

When $\phi=0$ degrees, case 3 reduces to case 1. When $\phi=90$ degrees, case 3 reduces to case 2. Since the e-ray propagation velocity depends on $n_e(\phi)$, then equation (1) shows that the e-ray transit time through a uniaxial crystal can be changed by adjusting $\phi$. This property is exploited in the present invention to make a tunable optical delay line.

B. Rotational Delay Line Comprised of One or Two RDCs

FIGS. 4 and 5 show two views of a first embodiment 25 of the present invention, which is comprised of a uniaxial birefringent crystal 26 of length L 28, having two parallel surfaces through which light will pass, and a means 38 to rotate the crystal about an axis parallel to its surface normal 30. The crystal 26 is cut so that the internal optical axis 32 makes an angle 36 of magnitude β with surface normal 30. Birefringent crystal 26 will hereafter be referred to as an RDC.

A second embodiment 27 of the present invention, shown in FIG. 6, has a second birefringent crystal or RDC 40 that is identical to RDC 26. The second RDC 40 is fixed in space with respect to the first RDC 26 either by direct attachment or some other means. The second RDC 40 is rotated around the surface normal 30 by π radians with respect to first RDC 26 so that the second RDC optic axis 42 is coplanar with the first RDC optic axis 32 and surface normal 30. The second optic axis 42 forms angle 44 of magnitude 2β with the first RDC optic axis 32.

Examples of uniaxial birefringent crystals that may be used for the first RDC 26 or second RDC 40 include yttrium orthovanadate (YVO4), alpha-barium borate (alpha-BBO), quartz, and calcite. Examples of a means to rotate RDC 26 in FIGS. 4 and 5, or the RDC pair 26 and 40 in FIG. 6, include a rotation stage or a motor with a shaft attached to either the first RDC 26 or the second RDC 40. In FIGS. 4-6 a shaft 38 is shown as a means of rotation with the rotation angle denoted by γ 48.

C Operation of Rotational Delay Line

An important quantity for understanding the operation of the RDL is "Time Delay". Referring to FIGS. 4-6, Time Delay is defined as the difference in transit time between light that travels from point A 54 to Surface S 70 along path P2 52 versus path P1 50. As will be further explained, in FIG. 4 path P1 50 and path P2 52 are the same while in FIG. 5 they are not. Correspondingly, in FIG. 4 Time Delay is zero and in FIG. 5 Time Delay is not zero.

The Rotational Delay Line 25 in FIGS. 4 and 5, and the Rotational Delay Line 27 in FIG. 6, is used by inclining the RDC 26 or RDC pair 26 and 40, so that the surface normal 30 makes a predetermined angle θ 62 relative to incident light ray 60. The angle of incidence θ 62 is set such that the ordinary ray refraction angle θ' 64 is equal in magnitude to the c-axis orientation angle β 36. That is, θ 62 is set so that $$|\theta_r| = |\beta| \quad (2)$$

or equivalently $$\sin(\theta) = n_o \sin(\beta) \quad (3)$$

since by Snell's Law of Refraction $$\sin(\theta) = n_o \sin(\theta_r). \quad (4)$$

In this case there is a unique rotational orientation of the RDC 26, such as the one shown in FIG. 4, where a light ray enters the RDC 26 and the refracted ordinary ray 50a travels parallel to c-axis 32. The propagation of a light ray inside the RDC 26 for this situation is described by Case 1 in section 6A. The propagation time from the point A 54 to the surface S 70, which is normal to the light ray 60, is polarization independent and the Time Delay is zero.

FIG. 5 shows another rotational orientation of RDC 26 in RDL 25. The c-axis 32 makes a nonzero angle $\phi$ 33 with the o-ray 50a. The propagation of a light ray inside the RDC 26 for this situation is described by Case 3 in section 6A and the propagation time from the point A 54 to the surface S 70 is polarization dependent. At point A 54 the incident ray 60 separates into an o-ray and an e-ray, both of which terminate at Surface S 70. The o-ray travels along path P1 50 and the e-ray travels along path P2 52. Path P2 52 includes an e-ray segment 50b inside the RDC 26 that is different from the o-ray segment 50a, which is part of path P1 50. The Time Delay for this orientation of the RDC 26, is not zero. Note that path P2 52 is different in FIGS. 4 and 5, while path P1 50 is not.

FIG. 4 and FIG. 5 taken together illustrate how the Rotational Delay Line 25 functions as a tunable optical delay line.

Simply by rotating the RDC 26 the e-ray path P2 52 and the corresponding Time Delay, can be varied in a smooth manner by an amount that depends only on the rotation angle γ 48. Note that unlike the prior art of FIG. 2, the angle of incidence θ 62 does not change as the Time Delay line is adjusted. This is extremely important because optical alignment and reflection coefficients at surfaces change with angle of incidence 13 in the prior art, but not in this invention.

The plane of polarization of the e-ray rotates as RDC 26 rotates and therefore for RDL 25 in FIGS. 4 and 5, or for the RDL 27 in FIG. 6 to function as a single polarization delay line there must be a means of maintaining the input polarization of incident ray 60 in the plane defined by the o-ray 50a and c-axis 32. This can be done in many ways such as by rotating the input polarization plane with a half wave plate. If ray 60 is not polarized in the plane defined by the o-ray 50a and c-axis 32 it will separate in to two rays, an o-ray and e-ray, as described earlier.

In some situations, such as in an optical autocorrelator, it is necessary that the incident beam 60 is polarized such that it will split into two orthogonally polarized rays of equal intensity, regardless of the rotational orientation of the first RDL 25 or second RDL 27. This can be guaranteed by placing a circular polarizer, comprised of a polarizer and quarter wave plate, in the incident beam path 60 in front of RDC 26.

FIG. 7 shows a curve 100 which is the result of a calculation of the Time Delay as a function of rotation angle γ 48. The curve 100 can be derived using formalism presented in optics textbooks which cover the topic of propagation of light in anisotropic media, such as "Principle of Optics" by M. Born and E. Wolf. For the exemplary calculated curve 100, incidence angle θ 62 is 30 degrees, RDC 26 is made from a birefringent material YVO4 with refractive indices $n_o$=1.9447 and $n_e$=2.1486. Relative to surface normal 30, the c-axis orientation angle β 36 is 14.9 degrees. When the rotation angle γ 48 is zero, the Time Delay is zero, but at all other values of γ 48 the Time Delay is positive.

Curve 110 in FIG. 7 shows the Time Delay, in the absence of RDC 26, in RDC 40 as a function of γ 48. The curve 110 is the same as curve 100 except shifted by 180 degrees due to the 180 degree rotation of the second RDC 40 relative to the first RDC 26. When both RDC 26 and RDC 40 are present as in FIG. 6, the Time Delay is curve 120, which is the difference between curve 110 and curve 100

The maximum value of the time delay in curve 120 is ±175 femtoseconds per mm length of YVO4. A larger maximum time delay is achievable in three ways:

1) use a larger crystal thickness L 28;
2) use a different material with refractive indices $n_o$ and $n_e$ that result in a larger maximum Time Delay per mm of crystal;
3) use a larger internal c-axis angle β 32.

Curve 120 has some important advantages as compared to the prior art of FIG. 3. Unlike the prior art of FIG. 3 curve 120 shows a Time Delay that 1) can be tuned to a positive or negative amount.
2) is symmetric with respect to the zero delay value.
3) is nearly linear as a function of rotation angle γ over a large tuning range 124 including in the range where the curve crosses zero.

These features are important in certain applications such as the delay line in an optical autocorrelator.

REDUCTION TO PRACTICE OF ROTATIONAL DELAY LINE

FIGS. 8-9

Application of Rotational Delay Line in an Optical Autocorrelator

An optical autocorrelator is an instrument that is used to measure the temporal width of femtosecond or picosecond light pulses. In most autocorrelators a periodic light beam of these temporally short pulses is split into two beams. One of the beams travels a fixed optical path to a detector and the other traverses a tunable optical delay line and is then recombined with the first light beam before entering the detector. By repeatedly scanning the optical delay line and recording the detector signal the width of the optical pulses can be measured.

FIG. 8a shows an embodiment of an optical autocorrelator 140 using a Rotational Delay Line 142. RDL 142 can be either the RDL 25 in FIG. 4 or the RDL 27 in FIG. 6. The autocorrelator 140 has a circular polarizer 143 comprised of a linear polarizer 144 and quarter wave plate 146 that prepares an incident beam 148 to have circular polarization. If the incident beam 148 is linearly polarized then the linear polarizer 144 is not necessary. If a polarizer 144 is used it can be of the plate type or a cubic polarization beam splitter. The circularly polarized beam gets decomposed in to two orthogonally polarized components of equal intensity as it enters the RDL 142. The incident beam 148 emerges after traveling through the RDL 142 and is focused with a lens 156 onto a photodetector unit 158 that is either a photodetector that detects two-photon absorption, or is a combination of a second harmonic crystal and photodetector fitted with an appropriate optical filter, that detects only the second harmonically generated light. The photodetector signal is recorded as the RDC unit 150 rotates, and an autocorrelation trace is obtained.

There are many variations of optical autocorrelator 140. FIG. 8b shows an embodiment of an autocorrelator 170 where a second quarter wave plate 172 and second polarizer 174 are used at the output of RDL 142 to insure that only one polarization of light is incident on photodetector unit 158. Either polarizer 144 or polarizer 174 can be replaced by an equivalent function polarization beam splitter FIG. 8c shows an embodiment of autocorrelator 180 where a reflector or retroreflector 182 is used to send the light back through RDL 142. The second pass through the RDC unit 150 doubles the generated Time Delay Range of RDL 142, and when a reflector is used this embodiment also has the advantage of removing the small spatial displacement between the two orthogonally polarized temporally displaced beams. A polarization beam splitter 160 is used in place of polarizer 144. A lens 156 and photodetector unit 158 are positioned to receive the retroreflected beam.

FIG. 9 shows a repetitive interferometric autocorrelation trace 200 acquired from an autocorrelator constructed according to the embodiment 180 in FIG. 8c. In this case an RDL constructed according to the RDL embodiment 27 in FIG. 6 was used and a motor was used as the means to rotate the RDC pair 150. The repetitive autocorrelation trace 200 recorded from an oscilloscope attached to the photodetector output displays all the features expected of an interferometric autocorrelator and the measured laser pulses were found to have a pulse width of about 100 femtoseconds.

Although specific embodiments of the present invention have been described with reference to the drawings, it should be understood that such embodiments are a subset of the possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A tunable optical rotational delay line apparatus for providing a continually adjustable time delay between two orthogonally polarized co-linear laser pulses, the rotational delay line apparatus comprising:
    a. a rotational delay crystal made of a parallel flat birefringent crystal having an ordinary refractive index $n_o$ and extra-ordinary refractive index $n_e$, wherein
        the unique optic axis of said rotational delay crystal is oriented at an angle $\beta$ to the rotational delay crystal surface normal, where $\beta$ is greater than 0 degrees and less than 90 degrees;
    b. a means of rotating said rotational delay crystal about its surface normal;
    c. whereby a time delay between said two orthogonally polarized co-linear laser pulses that travel through said rotational delay crystal can be continually adjusted by
        i. inclining said surface normal of said rotational delay crystal at an angle $\theta$ to the direction of travel of said co-linear laser pulses, where $\theta = n_o \sin(\beta)$;
        ii. rotating said rotational delay crystal about its surface normal.

2. The apparatus as defined in claim 1, further comprising a second rotational delay crystal identical to the first rotational delay crystal, wherein said second rotational delay crystal is rotated and fixed adjacent to said first rotational delay so that the angle formed by said first rotational delay crystal's unique optic axis and said second rotational delay crystal's unique optic axis is $2\beta$ and is bisected by said common surface normal.

3. The apparatus as defined in claim 1, wherein said flat birefringent crystal is selected from the group consisting of calcite crystal, quartz crystal, alpha-barium borate (alpha-BBO) crystal, rutile, and yttrium orthovanadate (YVO4) crystal.

4. The apparatus as defined in claim 1, where $\beta$ is approximately between 10 and 60 degrees.

5. An autocorrelator for measuring a laser pulse comprising:
    a. a circular polarizer;
    b. a rotational delay crystal made of a parallel flat birefringent crystal having an ordinary refractive index $n_o$ and extra-ordinary refractive index $n_e$, wherein
        the unique optic axis of said rotational delay crystal is oriented at an angle $\beta$ to the rotational delay crystal surface normal, where $\beta$ is between 0 and 90 degrees;
    c. a means of rotating said rotational delay crystal;
    d. a focusing lens; and a
    e. photodetector unit
    f. wherein said circular polarizer changes an incident light ray into two orthogonally polarized collinear rays;
    g. whereby a time delay between said two orthogonally polarized co-linear laser pulses that travel through said rotational delay crystal can be continually adjusted by
        i. inclining said surface normal of said rotational delay crystal at an angle $\theta$ to the direction of travel of said co-linear laser pulses, where $\theta = n_o \sin(\beta)$;
        ii. rotating said rotational delay crystal about its surface normal;
        iii. whereby said focusing lens focuses said two orthogonally polarized laser pulses onto said photodetector unit and said photodetector unit generates an electrical current proportional to said time delay generated by said rotational delay crystal.

6. The autocorrelator as defined in claim 5, wherein a second rotational delay crystal identical to the first rotational delay crystal is rotated and fixed adjacent to said first rotational delay so that the angle formed by said first rotational delay crystal's unique optic axis and said second rotational delay crystal's unique optic axis is $2\beta$ and is bisected by said common surface normal.

7. The autocorrelator as defined in claim 6, wherein said flat birefringent crystal is selected from the group consisting of calcite crystal, quartz crystal, alpha-barium borate (alpha-BBO) crystal, rutile, and yttrium orthovanadate (YVO4) crystal.

8. The autocorrelator as claimed in claim 6 further comprising a quarter wave plate and polarizer sequentially arranged and interposed between said second rotational delay crystal and said focusing lens.

9. The autocorrelator as claimed in claim 6 wherein said circular polarizer is a comprised of a polarization beamsplitter and quarter wave plate; and further comprising a retroreflector located behind said first and second rotational delay crystals whereby said retroreflector reflects light on a return path to said polarizing beam splitter whereby one polarization of said reflected light is directed by said polarization beam splitter to said focusing lens and said photodetector unit.

10. The autocorrelator as claimed in claim 9 wherein said retroreflector is a mirror.

11. A method of generating a time delay between two orthogonally polarized light pulses comprising
    a. inclining the surface normal of a flat birefringent crystal at an angle $\theta$ to the direction of travel of the incident light pulses said birefringent crystal having an internal unique optic axis oriented relative to said surface normal of said birefringent crystal at an angle of $\beta = \arcsin(\theta)/n_o$ where $\theta$ is such that $\beta$ is greater than 0 degrees and less than 90 degrees;
    b. providing a means of rotating said birefringent crystal, whereby a time delay between said two orthogonally polarized laser pulses that travel through said rotational delay crystal can be continually adjusted by rotating said rotational delay crystal about its surface normal.

12. The method of claim 11, wherein said flat birefringent crystal is selected from the group consisting of calcite crystal, quartz crystal, alpha-barium borate (alpha-BBO) crystal, and yttrium orthovanadate (YVO4) crystal.

13. The method of claim 11 further comprising, rotating by 180 degrees about its surface normal and attaching to said first birefringent crystal, a second identical birefringent crystal.

* * * * *